(12) United States Patent
Leuenroth et al.

(10) Patent No.: US 12,131,831 B2
(45) Date of Patent: Oct. 29, 2024

(54) SHEET BASED, IN-BUNDLE REACTIVITY CONTROL DEVICE FOR STORAGE OF SPENT NUCLEAR FUEL

(71) Applicant: Curtiss-Wright Flow Control Corporation, Davidson, NC (US)

(72) Inventors: Karl Scot Leuenroth, Newtown, CT (US); Matthew C. Harris, Hyde Park, NY (US)

(73) Assignee: CURTISS-WRIGHT FLOW CONTROL CORPORATION, Davidson, NC (US)

( * ) Notice: Subject to any disclaimer, the term of this patent is extended or adjusted under 35 U.S.C. 154(b) by 644 days.

(21) Appl. No.: 17/497,631

(22) Filed: Oct. 8, 2021

(65) Prior Publication Data

US 2022/0115153 A1    Apr. 14, 2022

Related U.S. Application Data

(60) Provisional application No. 63/089,887, filed on Oct. 9, 2020.

(51) Int. Cl.
*G21C 19/40* (2006.01)
*G21C 7/113* (2006.01)

(52) U.S. Cl.
CPC .............. *G21C 19/40* (2013.01); *G21C 7/113* (2013.01)

(58) Field of Classification Search
CPC .......... G21C 7/10; G21C 7/113; G21C 19/40
See application file for complete search history.

(56) References Cited

U.S. PATENT DOCUMENTS

| | | |
|---|---|---|
| 3,013,725 A | 12/1961 | Lee |
| 4,608,495 A | 8/1986 | Jacobson |
| 4,800,283 A | 1/1989 | Efferding |
| 5,416,813 A | 5/1995 | Hiraiwa |
| 5,479,463 A | 12/1995 | Roberts |
| 5,592,522 A | 1/1997 | Holden |
| 5,629,964 A | 5/1997 | Roberts |
| 5,812,623 A | 9/1998 | Holden |
| 5,841,825 A | 11/1998 | Roberts |
| 6,327,321 B1 | 12/2001 | Holman |
| 6,741,669 B2 | 5/2004 | Lindquist |

(Continued)

FOREIGN PATENT DOCUMENTS

| | | |
|---|---|---|
| DE | 19628362 C1 | 3/1998 |
| EP | 0016252 A1 | 10/1980 |

(Continued)

OTHER PUBLICATIONS

International Search Report and Written Opinion of Corresponding Application No. PCT/US2015/037393; dated Sep. 24, 2015.

(Continued)

*Primary Examiner* — Sharon M Davis
(74) *Attorney, Agent, or Firm* — Pearne & Gordon LLP

(57) ABSTRACT

A neutron absorber member is configured to be inserted into a control rod guide tube of a spent fuel assembly. The neutron absorber member includes a first plate and a second plate. The first plate extends along a longitudinal axis between a first end and a second end. The first plate has a slot formed therethrough at the first end. The slot extends from the first end towards the second end. The second plate is disposed within the slot of the first plate. The first plate and the second plate are arranged to have a cross-sectional shape of a cruciform.

20 Claims, 10 Drawing Sheets

(56) References Cited

U.S. PATENT DOCUMENTS

| | | |
|---|---|---|
| 6,891,914 B1 | 5/2005 | Sakashita et al. |
| 8,717,849 B1 | 5/2014 | Zarnetske |
| 2010/0176314 A1 | 7/2010 | Smith |
| 2010/0176318 A1 | 7/2010 | Smith |
| 2011/0064182 A1 | 3/2011 | Kawashima et al. |

FOREIGN PATENT DOCUMENTS

| | | |
|---|---|---|
| EP | 1 096 507 A1 | 5/2001 |
| GB | 1 126 218 A | 9/1968 |
| JP | H02129598 A | 5/1990 |
| JP | 107-146390 A | 6/1995 |
| JP | 2980394 B2 | 11/1999 |
| JP | 2002-328192 A | 11/2002 |
| WO | 00/26921 A2 | 5/2000 |

OTHER PUBLICATIONS

International Search Report and Written Opinion of Corresponding Application No. PCT/US2021/054261 dated Apr. 26, 2022.

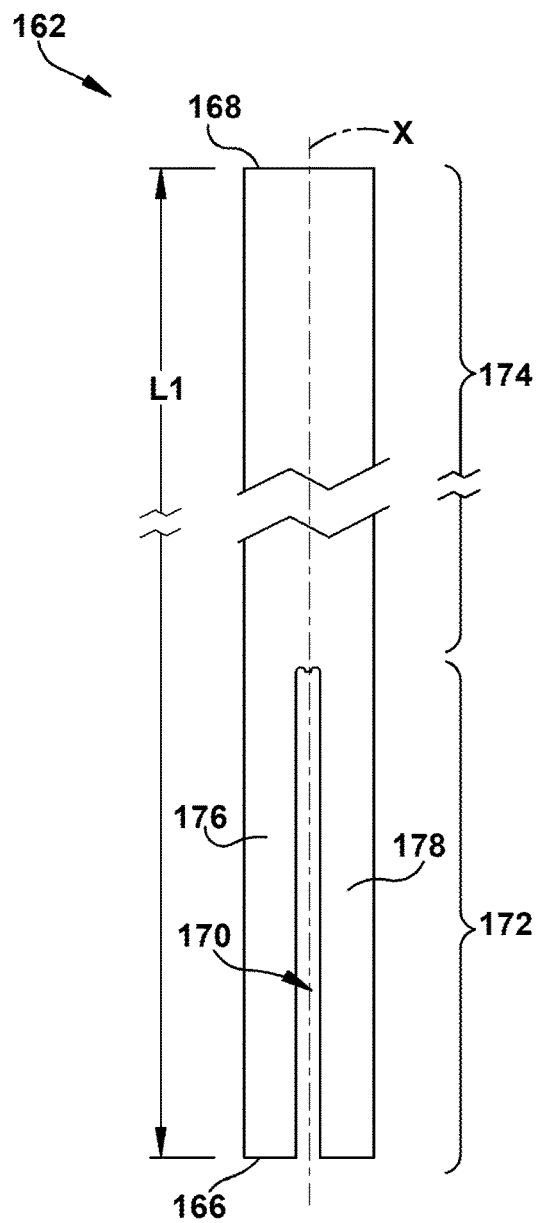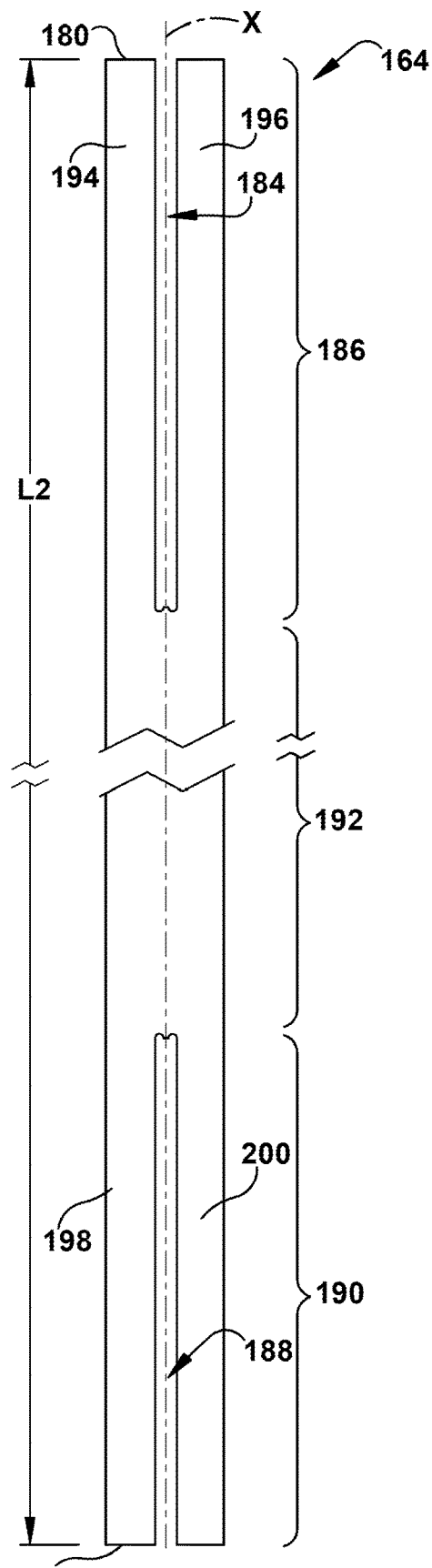

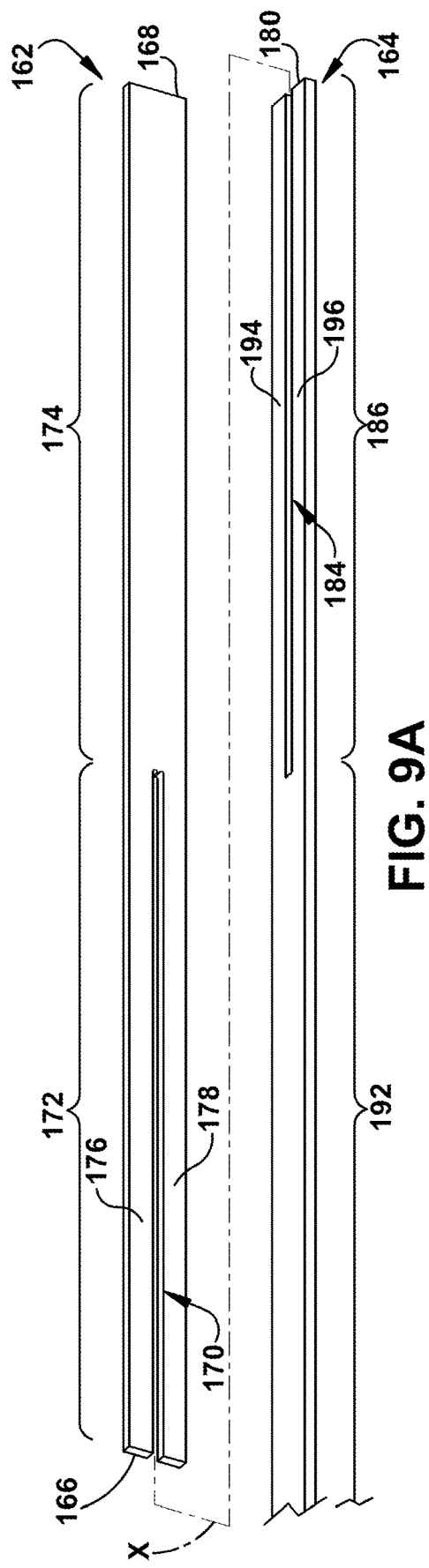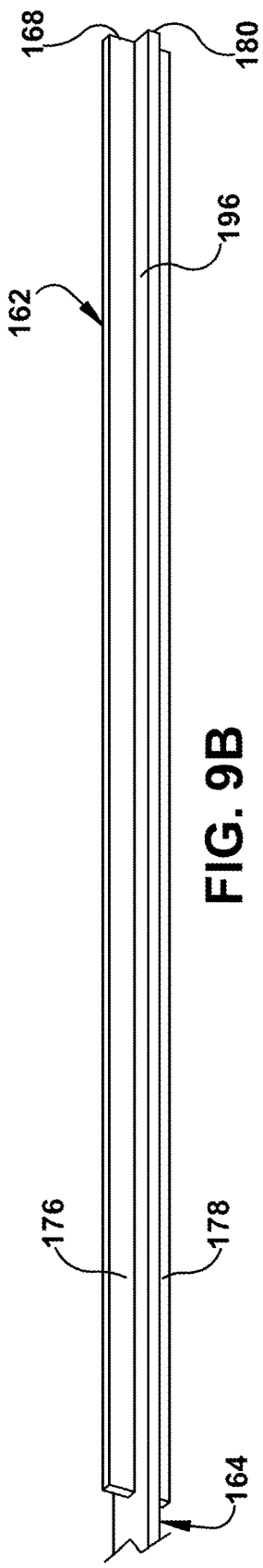
FIG. 9A
FIG. 9B

SHEET BASED, IN-BUNDLE REACTIVITY CONTROL DEVICE FOR STORAGE OF SPENT NUCLEAR FUEL

CROSS-REFERENCE TO RELATED APPLICATIONS

This application claims priority from U.S. Provisional Application No. 63/089,887, filed on Oct. 9, 2020, hereby incorporated herein in its entirety by reference.

FIELD OF THE INVENTION

This application relates generally to a neutron absorber assembly removably disposed within a control rod guide tube of a spent fuel assembly, and more particularly, a neutron absorber member constructed from sheet or plate-shaped materials.

BACKGROUND OF THE INVENTION

Commercial nuclear power plants use spent fuel pools to store fresh and irradiated fuel assemblies in stainless steel, high density spent fuel racks. The fuel assemblies contain enriched uranium (and plutonium) in metal clad fuel rods in a square array to produce neutrons via nuclear fission. In order to control the fission reaction, neutron absorbers are utilized to remove excess neutrons to provide control of the fission rate. In particular, the effectiveness of the neutron absorber is dependent (inversely proportional) to the energy of the neutrons that cause fission. Consequently, for a neutron absorber to be effective, the relatively high-energy neutrons produced during fission must be slowed down (or thermalized) to lower energies, which is generally achieved by allowing the neutrons to undergo a collision with a low-mass molecule (e.g., water). Specifically, water, known as a moderator, absorbs a majority of a neutron's kinetic energy during the collision, allowing the neutron to slow down. Once the neutrons have slowed down, the neutron absorbers become more effective at absorbing them.

Boron-10 isotope is one possible material that may be used as a neutron absorber. In particular, Boron-10 isotope is very effective at absorbing thermal (low-energy) neutrons. The effectiveness of Boron-10 isotope is increased when it is surrounded by several centimeters of water. The water helps to slow down (i.e., deenergize) the neutrons. As such, the efficiency of the neutron absorber (constructed from Boron-10 isotope) increases as the amount of water surrounding the neutron absorber increases.

It is conventionally known to manufacture neutron absorbers from Boron-10 isotope, wherein the thickness of the neutron absorber is relatively large. However, it has been found that increasing the thickness of such neutron absorbers actually reduces absorption efficiency thereof because the slowest neutrons are absorbed by the outer layers of Boron-10 isotope.

As noted above, Boron-10 isotope's ability to absorb thermal neutrons is inversely proportional to the energy of said neutron. Thus, neutrons with very low energy levels (known as "thermal neutrons" because their energy is merely a result of thermal energy created via vibrations) have the highest probability of being absorbed by the Boron-10 isotope. When a neutron beam flux is scattered through a neutron absorber (i.e., being Boron-10 isotope based), the neutrons with the lowest energies are absorbed initially on the surface thereof. As the low-energy neutrons are removed, the neutron flux that penetrates to the interior layers of the neutron absorber is comprised of higher energy neutrons, which Boron-10 isotope atoms are less likely to absorb. Accordingly, it is more advantageous to employ neutron absorbers having relatively small thicknesses and/or cross-sections (on the mean-free path travel distance of a low energy neutron). Said differently, the larger the thickness of a neutron absorber, the less efficient the inner Boron-10 isotope is at absorbing neutrons. Consequently, manufacturing neutron absorbers (from Boron-10 isotope) having relatively large thicknesses does not provide a linearly proportional increase in neutron absorption.

Further, extruding is a commonly known fabrication technique for manufacturing conventional neutron absorbers. For example, raw materials of Boron-10 isotope can be extruded to produce a solid rod neutron absorber. However, this known technique (i.e., extruding) limits the neutron absorber's weight fraction of Boron-10 isotope to around 15 weight percent.

BRIEF SUMMARY OF THE INVENTION

In accordance with one aspect, there is provided a neutron absorber member that is configured to be inserted into a control rod guide tube of a spent fuel assembly. The neutron absorber member includes a first plate having an elongated body extending along a longitudinal axis between a first end and a second end. The first plate has a slot formed therethrough at the first end. The slot extends from the first end towards the second end. The neutron absorber member also includes a second plate disposed within the slot of the first plate. The first plate and the second plate are arranged to have a cross-sectional shape of a cruciform.

In accordance with another aspect, there is provided a neutron absorber assembly that is configured to be inserted into a control rod guide tube of a spent fuel assembly. The neutron absorber assembly includes a hollow, elongated body extending along a longitudinal axis between a first end and a second end. A cap is disposed at the first end of the hollow body, and a tip is disposed at the second end of the hollow body. A neutron absorber member is received within the hollow body and extends along the longitudinal axis. The neutron absorber member has a first plate and a second plate that are separate from one another and that are arranged with respect to one another to have a cross-sectional shape of a cruciform.

In accordance with a further aspect, there is provided a neutron absorber member that is configured to be inserted into a control rod guide tube of a spent fuel assembly. The neutron absorber member includes a first plate having an elongated body extending along a longitudinal axis between a first end and a second end. The first plate has a slot formed therethrough at the first end. The slot extends from the first end towards the second end and defines first and second prongs such that the first prong is laterally spaced from the second prong by the slot. A second plate is disposed within the slot of the first plate. The second plate has an elongated body extending along the longitudinal axis between a first end and a second end. The second plate has a first slot formed therethrough at the first end. The first slot extends from the first end of the second plate towards the second end of the second plate and defines first and second prongs of the second plate such that the first prong of the second plate is laterally spaced from the second prong of the second plate by the first slot.

The first plate is disposed within the first slot of the second plate such that the first prong and the second prong of the first plate are disposed adjacent respective, opposite faces of the second plate and the first prong and the second prong of the second plate are disposed adjacent respective, opposite faces of the first plate. Further, the first plate and the second plate are arranged to have a cross-sectional shape of a cruciform.

In accordance with a still further aspect, there is provided a neutron absorber member that is configured to be inserted into a control rod guide tube of a spent fuel assembly. The neutron absorber member including at least one plate formed from a flat sheet material and formed to define an elongated body extending along a longitudinal axis between a first end and a second end. The at least one plate having a constant cross-sectional shape between the first end and the second end.

BRIEF DESCRIPTION OF THE DRAWINGS

FIG. 7 is a top view of an end-plate of a neutron absorber member of the neutron absorber assembly shown in FIG. 3;

FIG. 8 is a top view of a central-plate of the neutron absorber member of the neutron absorber assembly shown in FIG. 3;

FIG. 9A is a partial, perspective view of the end-plate shown in FIG. 7 and the central-plate shown in FIG. 8, in a pre-assembled position;

FIG. 9B is a partial, perspective view of the end-plate shown in FIG. 7 and the central-plate shown in FIG. 8 in a completely assembled position;

DESCRIPTION OF EXAMPLE EMBODIMENTS

Figure 1:
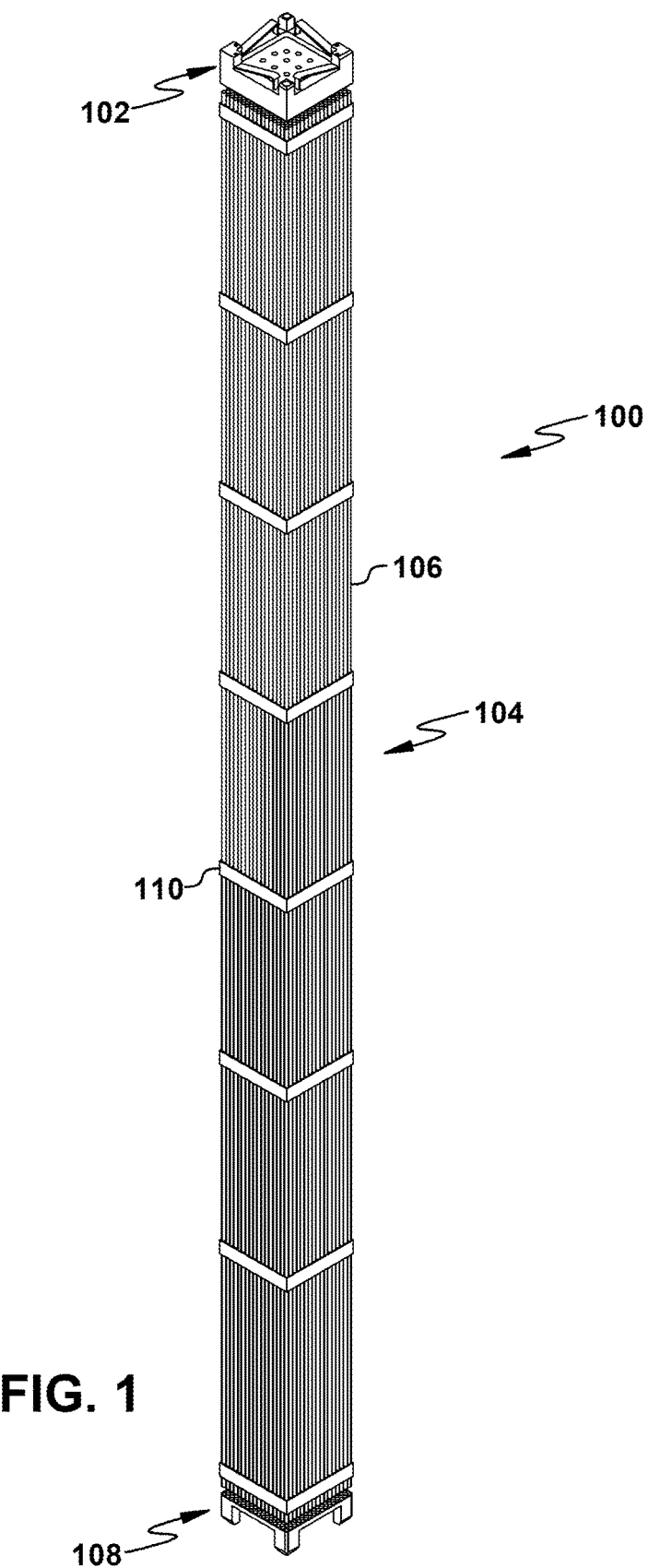
FIG. 1 is a perspective view of a fuel assembly.

Referring now to the drawings, FIG. 1 depicts a perspective view of a spent fuel assembly 100 including a top nozzle 102, a bundle 104 of fuel rods 106, and a bottom nozzle 108. The bundle 104 of fuel rods 106 extends between the top nozzle 102 and the bottom nozzle 108. The fuel rods 106 may be secured in the bundle 104 formation via at least one grid guide 110. As shown, a plurality of grid guides 110 are disposed at spaced locations along the length of the spent fuel assembly 100, wherein each grid guide 110 peripherally surrounds the plurality of fuel rods 106. As further shown, respective, peripheral shapes of the top nozzle 102 and the bottom nozzle 108 correspond to a peripheral shape of the bundle 104 of fuel rods 106. It is also contemplated that the top nozzle 102 and/or bottom nozzle 108 can have a peripheral shape that differs from that of the bundle 104 of fuel rods 106.

Figure 2:
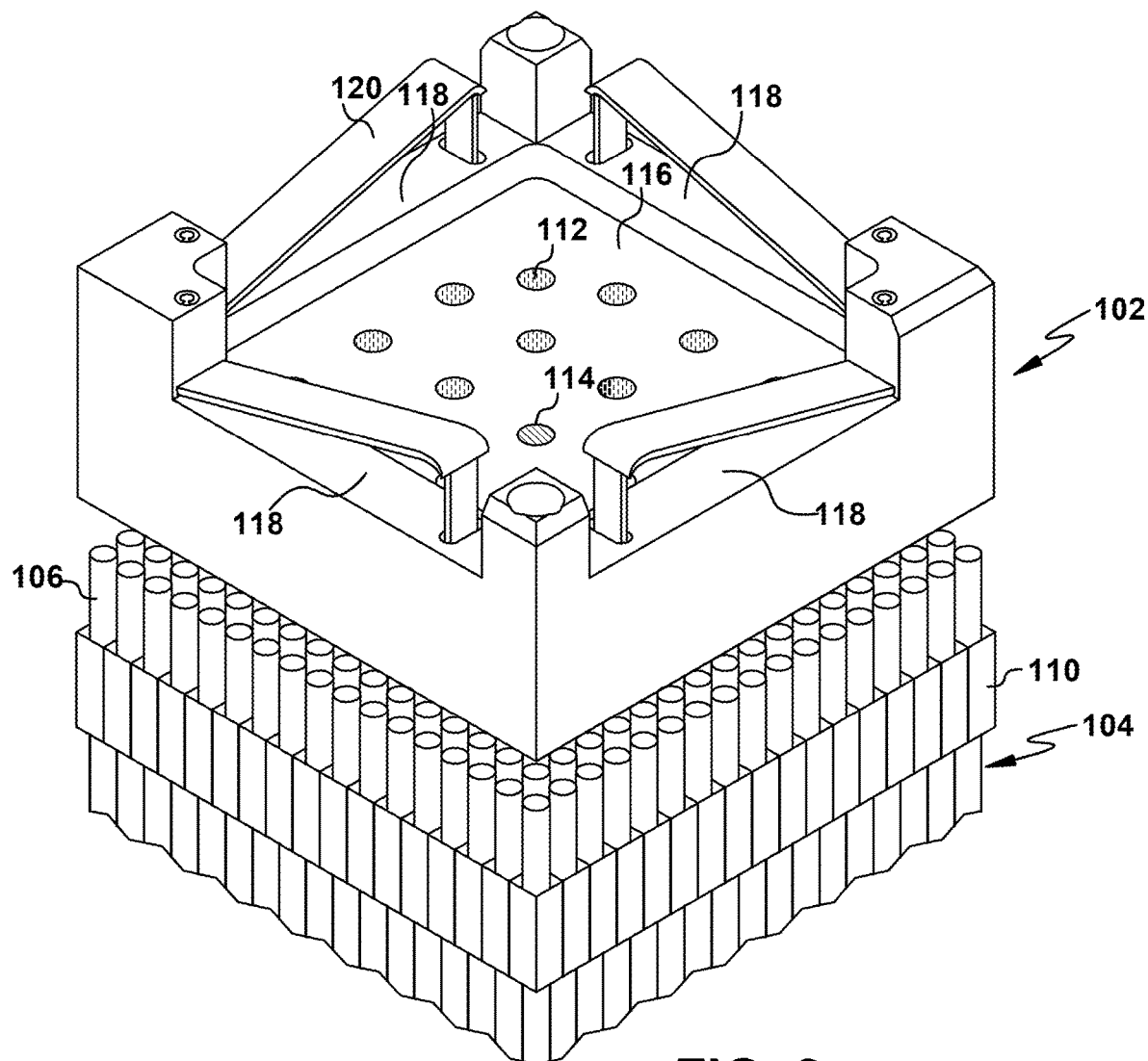
FIG. 2 is a perspective view of an upper portion of the fuel assembly shown in FIG. 1.

Moving on to FIG. 2, at least one control rod guide tube 112 and an instrumentation tube 114 are located within an interior portion of the bundle 104. In the examples described and illustrated herein, the instrumentation tube 114 is located in a center of the bundle 104, and multiple control rod guide tubes 112 are disposed in various positions within the bundle 104 surrounding the instrumentation tube 114. It is also contemplated that the control rod guide tubes 112 and the instrumentation tube 114 can be placed at any location within the bundle 104 to maintain reactivity control of the fuel rods 106 during operation or subcriticality of the fuel assembly 100 after the fuel in the fuel rods 106 is spent. Also, the number of control rod guide tubes 112 included within the bundle 104 may vary such that control of the fuel rods 106 during operation or subcriticality of the fuel assembly 100 after the fuel in the fuel rods 106 is spent is maintained.

The control rod guide tubes 112 and the instrumentation tubes 114 are accessible at the top nozzle 102 through a top surface 116 thereof. The top surface 116 has a predominately square periphery bounded by a plurality of ledges 118 standing tall from the top surface 116. As further shown, a plurality of springs 120 (e.g., hold-down springs) are positioned on, and configured to collapse within, the ledges 118 in order to position the fuel assembly 100 in relation to other elements of a reactor (not shown) during reactor operation.

During operation of the reactor in which the fuel assembly 100 is used, a flux-probing monitor (not shown) may be inserted into the instrumentation tube 114 to map local neutron flux. In the example described herein, the fuel assembly 100 is described as being a pressurized water reactor type fuel assembly. However, other types of reactors are contemplated (e.g., boiling water reactors, etc.).

After the fuel assembly 100 is spent or depleted and moved into a storage pool of water (not shown), neutron absorber members are inserted into the control rod guide tubes 112 to absorb neutrons emanating from the fuel rods 106, thereby maintaining subcriticality of the fuel assembly 100 within the storage pool. The fuel assembly 100 is submerged in a deep spent fuel pool for upwards of 10 to 20 years, after which time, the fuel assembly 100 is transferred to dry casks and transported to dry storage areas for long-term safe storage.

Figure 3:
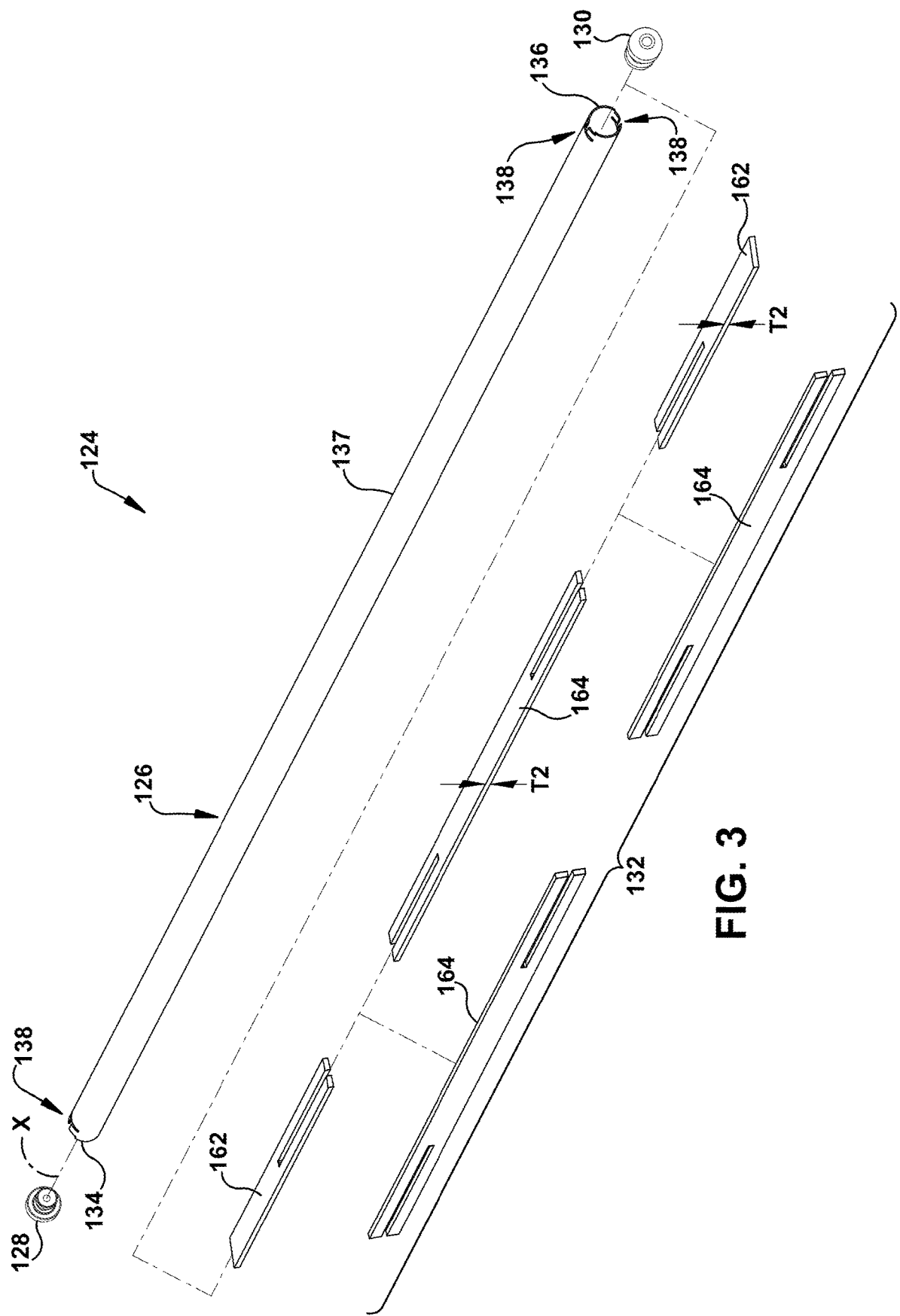
FIG. 3 is an exploded view of a neutron absorber assembly.
Figure 10:
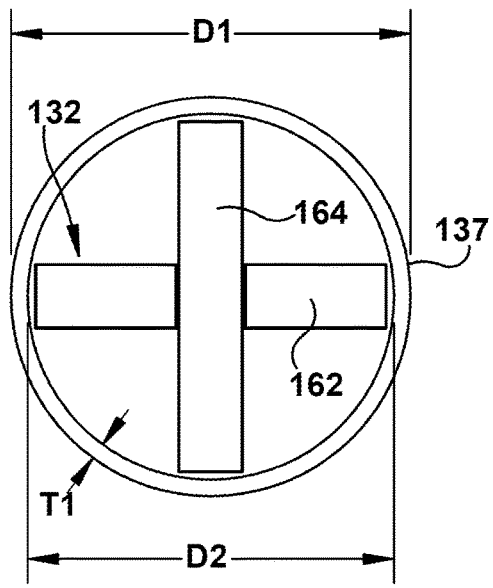
FIG. 10 is a cross-sectional view of the neutron absorber assembly shown in FIG. 3 illustrating the neutron absorber member disposed within the body.

Moving on to FIG. 3, a neutron absorber assembly 124 is shown in an exploded view, and includes a body 126, a cap 128, a tip 130, and a neutron absorber member 132. The body 126 is an elongated hollow tube extending along a longitudinal axis X, between a first end 134 and a second end 136. Specifically, the body 126 is shown in the shape of a cylinder, having a circumferential wall 137 with a thickness T1 within a range of 0.030 inches to 0.049 inches, and preferably 0.035 inches (best shown in FIG. 10). Moreover, the circumferential wall 137 has a continuous diameter throughout its length (i.e., along the longitudinal axis X). For example, (as shown in FIG. 10) the circumferential wall 137 has an external diameter D1 within a range of 0.870 inches to 0.880 inches, and preferably is 0.875 inches, and has an internal diameter D2 within a range of 0.821 inches to 0.850 inches, and preferably is 0.840 inches. However, it is to be understood that the body 126 need not have a cylindrical shape with the above-noted dimensions. Rather, the body 126 can have any geometric shape with any desired dimensions. Further, the body 126 is manufactured from a metal (e.g., steel) capable of enduring corrosive environments (e.g., grade 304 stainless steel).

Figure 4:
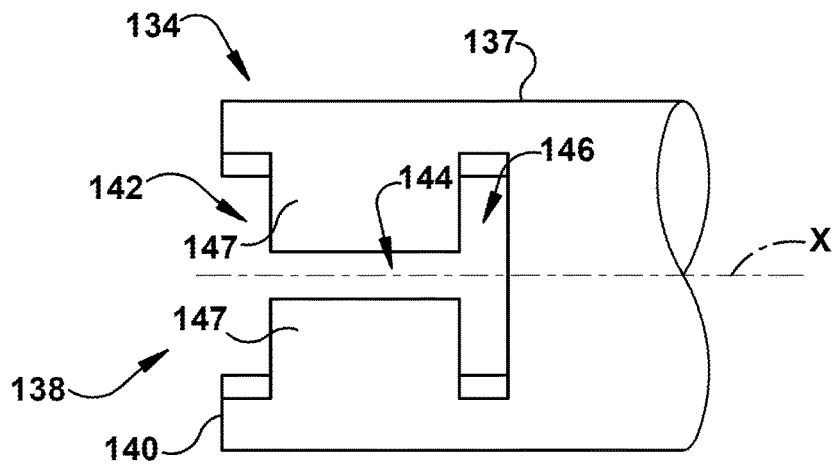
FIG. 4 is a side-view of a first end of a body of the neutron absorber assembly shown in FIG. 3.

As further shown, each of the first and second ends 134, 136 of the body 126 includes a pair of cut-outs 138 formed therein. Specifically, each cut-out of the pair of cut-outs 138 is a mirror image shape of the other and is positioned at an opposing side of the body 126 (i.e., one cut-out of the pair of cut-outs 138 aligns with and faces the other cut-out of the same pair of cut-outs 138). With reference to FIG. 4, the pair of cut-outs 138 formed in the first end 134 of the body 126 are shown. It is to be understood that the pair of cut-outs 138 in the second end 136 of the body 126 have the same or similar configuration and geometry as that of the first end 134 of the body 126. However, this need not be the case, as the pair of cut-outs 138 of the first end 134 can differ from those of the second end 136.

As shown in FIG. 4, the first end 134 of the body 126 has a distal edge 140 from which the pair of cut-outs 138 extend. Specifically, the pair of cut-outs 138 extend from the distal edge 140 of the first end 134 in a direction towards the second end 136 of the body 126. Each cut-out of the pair of cut-outs 138 includes a first section 142, a second section 144, and a third section 146, all of which have a generally rectangular shape. It is to be understood that the shapes of each section are not limited to that of a rectangle, as other geometric shapes are contemplated (e.g., square, circles, ovals, triangles, etc.), and that each section can have a different shape with respect to the others.

The first section 142 is recessed inwards from the distal edge 140 of the first end 134 and extends in a circumferential direction of the body 126. The third section 146 has a similar configuration to the first section 142 in that the third section 146 likewise extends in a circumferential direction of the body 126. In particular, the third section 146 is spaced from the first section 142 and is connected therewith via the second section 144. As shown, the second section 144 spans the distance between the first section 142 and the third section 146 and is oriented parallel to the longitudinal axis X of the body 126. In this manner, the first section 142, second section 144, and third section 146 collectively form a continuous cut-out (i.e., aperture) through the circumferential wall 137 of the body 126. The first section 142, second section 144, and third section 146 of each cut-out 138 further collectively define tabs 147 having respective distal ends facing one another.

Figure 5:
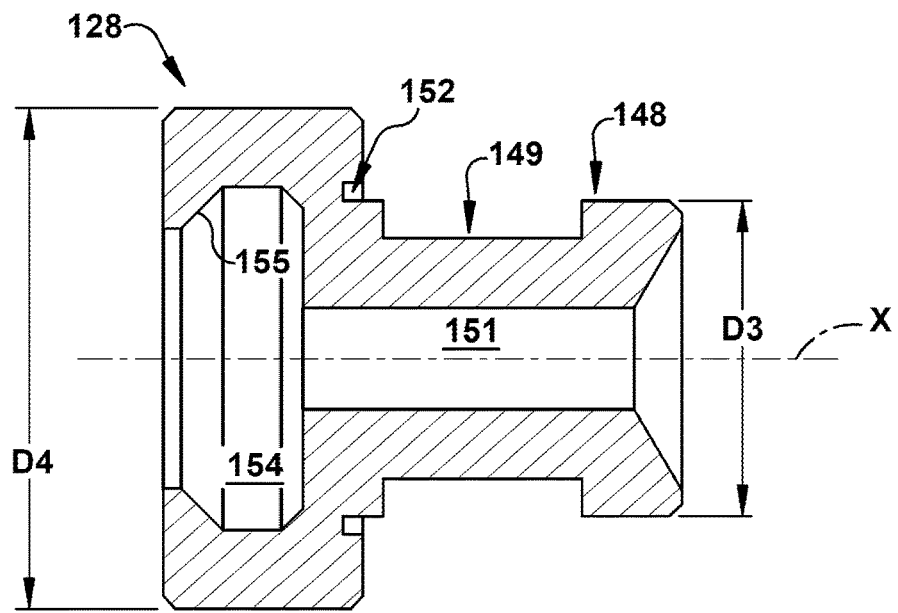
FIG. 5 is a cross-sectional view of a cap of the neutron absorber assembly shown in FIG. 3.

Briefly moving back to FIG. 3, the cap 128 is shown as having a generally cylindrical configuration. That is, the cap 128 has the same geometric configuration as the body 126. However, this need not be the case as the cap 128 can have a different shape from the body 126. Moreover, in an installed position, the cap 128 is configured to be coaxial with the body 126 (i.e., the cap 128 is likewise configured to extend along the longitudinal axis X). Now moving to FIG. 5, the cap 128 is shown as including an insertion tube 148 and head 150. The insertion tube 148 and the head 150 can be formed integral with one another (i.e., simultaneously during a single manufacturing step), or can be formed separate and distinct from one another and subsequently secured to each other.

The insertion tube 148 is formed in the shape of a cylinder and has an outer diameter D3. Specifically, the outer diameter D3 of the insertion tube 148 is less than the internal diameter D2 of the circumferential wall 137. In this manner, the insertion tube 148 is able to be inserted into the body 126, as will be further discussed below. Further, the insertion tube 148 has a receiving groove 149 formed annularly therein. As will be further explained below, in an installed position, the receiving groove 149 of the insertion tube 148 is sized and shaped to accept the tabs 147 defined by each cut-out 138 of the first end 134 of the body 126. The insertion tube 148 is hollow and defines a passageway 151 therethrough. More specifically, the passageway 151 extends completely through the entire length of the insertion tube 148 (i.e., along the longitudinal axis X). Moreover, the head 150 has an outer diameter D4 that is greater than the external diameter D1 of the circumferential wall 137 of the body 126. In this manner, the head 150 acts as a stop to ensure proper insertion/installation with respect to the body 126, as will be discussed further below.

As further shown, an annular groove 152 is formed in the head 150 and peripherally surrounds the insertion tube 148. That is, the annular groove 152 is circular in shape and circumscribes the insertion tube 148. The annular groove 152 is configured to receive the distal edge 140 of the first end 134 of the body 126, as will be further discussed below. Moreover, a cavity 154 is formed in the head 150 and is defined by an inner sidewall 155 having a generally concave shape. As further shown, the passageway 151 of the insertion tube 148 connects with the cavity 154 formed in the head 150. In this manner, the entire cap 128 is hollow.

Figure 6:
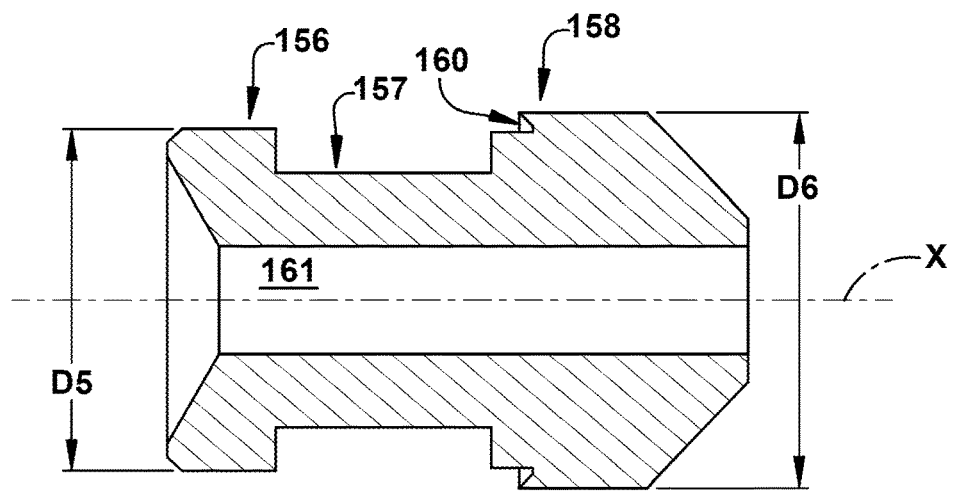
FIG. 6 is a cross-sectional view of a tip of the neutron absorber assembly shown in FIG. 3.

Moving back to FIG. 3, the tip 130 is likewise shown as having a generally cylindrical configuration. That is, the tip 130 has the same geometric configuration as the body 126 and the cap 128. However, this need not be the case as the tip 130 can have a different configuration from the body 126 and/or cap 128. Moreover, in an installed position, the tip 130 is configured to be coaxial with the body 126 (i.e., the tip 130 is likewise configured to extend along the longitudinal axis X). Now moving to FIG. 6, the tip 130 is shown as including an insertion member 156 and a tip member 158. The insertion member 156 and the tip member 158 can be formed integral with one another (i.e., simultaneously during a single manufacturing step), or can be formed separate and distinct from one another and subsequently secured to each other.

The insertion member 156 is formed in the shape of a cylinder and has an outer diameter D5. Similar to the insertion tube 148 of the cap 128, the outer diameter D5 of the insertion member 156 is less than the internal diameter D2 of the circumferential wall 137 of the body 126. In this manner, the insertion member 156 is able to be inserted into the body 126. Also, the insertion member 156 has a reception groove 157 formed annularly therein. As will be explained below, in an installed position, the reception groove 157 of the insertion member 156 is sized and shaped to accept the tabs 147 defined by each cut-out 138 formed in the second end 136 of the body 126. As further shown, the tip member 158 is generally cylindrical in shape with a distal end thereof being conically shaped. The tip member 158 has an outer diameter D6 that is greater than the external diameter D1 of the circumferential wall 137 of the body 126. In this manner, similar to the head 150 of the cap 128, the tip member 158 acts as a stop to ensure proper insertion/installation with respect to the body 126.

As further shown, an annular groove 160 is formed in the tip member 158 and peripherally surrounds the insertion member 156. That is, the annular groove 160 is circular in shape and circumscribes the insertion member 156. The annular groove 160 is configured to receive a distal edge of the second end 136 of the body 126. Moreover, the tip 130 is hollow such that a passageway 161 extends completely therethrough. That is, the passageway 161 extends completely through both the insertion member 156 and the tip member 158.

Moving back to FIG. 3, the neutron absorber member 132 comprises a plurality of plates that, when completely assembled, collectively form the neutron absorber member 132. All of the plates are manufactured from metal matrix composites (e.g., boron carbide), wherein raw materials of the metal matrix composites are rolled into flat, planar sheets (i.e., the plates). The manufacturing process of rolling permits a greater weight fraction of Boron in the finished neutron absorber member 132 than compared to the conventional technique of extruding, as detailed above. In particular, by forming the plates via rolling, the finished neutron absorber member 132 can have a weight fraction of Boron that meets or even exceeds 40 weight percent. Further still, the technique of rolling simplifies fabrication of the neutron absorber member 132.

As shown, the neutron absorber member 132 comprises a plurality of end-plates 162 and a plurality of central-plates 164. As will be further detailed below, in an installed position, the plurality of end-plates 162 and the plurality of central-plates 164 are positioned within the body 126 and extend along the longitudinal axis X. Further, in the depicted example, the neutron absorber member 132 includes two end-plates 162 and three central-plates 164. However, it is to be understood that the overall number of end-plates 162 and central-plates 164 is not limited to two and three, respectively, and that any number and combination of the end-plates 162 and central-plates 164 may be employed to construct the neutron absorber member 132. For example, the neutron absorber member 132 can be made up entirely of central-plates 164, or even only two end-plates 162. Moreover, it is shown that all of the plurality of end-plates 162 have the same configuration, and that all of the plurality of central-plates 164 likewise have the same configuration.

Further, the end-plates 162 and the central-plates 164 have similar or the same dimensions with respect to thickness. For example, the end-plates 162 and the central-plates 164 can all have a thickness T2 within a range of 0.125 inches to 0.250 inches, and preferably 0.236 inches. However, it is contemplated that the end-plates 162 can have a thickness that is different from that of the central-plates 164. As noted above, all of the plates (i.e., the end-plates 162 and the central-plates 164) that collectively form the neutron absorber member 132 are fabricated via a rolling process. Due to this fabrication technique, the end-plates 162 and the central-plates 164 are able to achieve the relatively small thicknesses, detailed above. By fabricating the end-plates 162 and the central-plates 164 to have relatively small thicknesses, compared to those fabricated from conventionally known techniques (e.g., extruding), the overall absorption efficiency of the neutron absorber member 132 is increased when compared to those fabricated using the conventional techniques. In other words, fabricating the plates of the neutron absorber member 132 via rolling provides two technical advantages: (1) the fabricated plates generally have a weight fraction of Boron that meets or exceeds 40 weight percent (which is much greater than the weigh fraction of Boron generally achieved by extruding; i.e., 15 weight percent); and (2) the plates have generally smaller thicknesses in comparison to the neutron absorber members commonly known in the art, which provides an increase in overall absorption efficiency when compared to that of the conventional neutron absorber members.

With reference to FIGS. 7 and 8, examples of a single end-plate 162 and a single central-plate 164 are respectively shown. For brevity, the below-disclosures will be made with respect to only the single end-plate 162 and the single central-plate 164, unless otherwise stated, with the understanding that the disclosures likewise apply to the other end-plate 162 and central-plates 164, depicted in FIG. 3.

As shown in FIG. 7, the end-plate 162 is generally rectangular in shape, extending longitudinally (i.e., along the longitudinal axis X) a distance L1 between a first end 166 and a second end 168. A slot 170 is formed in the first end 166 of the end-plate 162, and more particularly within a first region 172 of the end-plate 162. That is, the first region 172 of the end-plate 162 is defined as the portion of the end-plate 162 (extending along the longitudinal axis X) having the slot 170 formed therethrough. The slot 170 is formed completely through the end-plate 162 (i.e., at the first region 172) and extends from the first end 166 towards the second end 168 in a direction parallel to the longitudinal axis X. A second region 174 of the end-plate 162 extends from the first region 172 to the second end 168. That is, the second region 174 of the end-plate 162 is defined as the portion of the end-plate 162 (extending along the longitudinal axis X) having no slot formed therein. As illustrated, the slot 170 defines first and second prongs 176, 178 of the first region 172. That is, the first prong 176 is laterally spaced from the second prong 178 via the slot 170. Of note, the distance between the first prong 176 and the second prong 178 (in a direction perpendicular to the longitudinal axis X) is greater than the thickness T2 of the end-plates 162 and/or the central-plates 164, discussed above.

Similar in some respects to the end-plate 162, the central-plate 164 shown in FIG. 8 is generally rectangular in shape, extending longitudinally (i.e., along the longitudinal axis X) a distance L2 between a first end 180 and a second end 182. Of note, the distance L2 of the central-plate 164 is larger than the distance L1 of the end-plate 162, and more particularly, the distance L2 is two times the distance L1. Said differently, the central-plate 164 is two times as long as the end-plate 162.

A first slot 184 is formed in the first end 180 of the central-plate 164, and more particularly within a first region 186 of the central-plate 164. That is, the first region 186 of the central-plate 164 is defined as the portion of the central-plate 164 (extending along the longitudinal axis X) having the first slot 184 formed therethrough. The first slot 184 is formed completely through the central-plate 164 (i.e., at the first region 186) and extends from the first end 180 towards the second end 182 in a direction parallel to the longitudinal axis X. As further shown, a second slot 188 is formed in the second end 182 of the central-plate 164, and more particularly within a second region 190 of the central-plate 164. That is, the second region 190 of the central-plate 164 is defined as the portion of the central-plate (extending along the longitudinal axis X) having the second slot 188 formed therethrough. The second slot 188 is formed completely through the central-plate 164 (i.e., at the second region 190) and extends from the second end 182 towards the first end 180 in a direction parallel to the longitudinal axis X.

A bridge region 192 of the central-plate 164 extends from the first region 186 to the second region 190. That is, the bridge region 192 of the central-plate 164 is defined as the portion of the central-plate 164 (extending along the longitudinal axis X) disposed between the first and second regions 186, 190, and having no slot formed therein. As shown, the first slot 184 defines first and second prongs 194, 196 of the first region 186 of the central-plate 164. That is, the first prong 194 is laterally spaced from the second prong 196 via the first slot 184. Similarly, the second slot 188 defines third and fourth prongs 198, 200 of the second region 190 of the central-plate 164, wherein the third prong 198 is laterally spaced from the fourth prong 200 via the second slot 188. Of note, the distance between the first prong 194 and the second prong 196 (in a direction perpendicular to the longitudinal axis X) and the distance between the third prong 198 and the fourth prong 200 (in a direction perpendicular to the longitudinal axis X) are both greater than the thickness T2 of the end-plates 162 and/or the central-plates 164, discussed above.

Moving on to FIGS. 9A and 9B, assembling the neutron absorber member 132 will now be discussed. As shown in FIG. 9A, the end-plate 162 and the central-plate 164 are aligned on the longitudinal axis X such that the first end 166 of the end-plate 162 faces the first end 180 of the central-plate 164. Further, the end-plate 162 and the central-plate 164 are oriented such that imaginary planes (not shown) along which the end-plate 162 and the central-plate 164 respectively lie are arranged perpendicular to one another. Thereafter, the end-plate 162 and the central-plate 164 are translated along the longitudinal axis X in a direction towards one another (i.e., along the longitudinal axis X in opposite directions). Due to the fact that the slot 170 of the end-plate 162 and the first slot 184 of the central-plate 164 are coaxial, the second region 174 of the end-plate 162 and the first region 186 of the central-plate 164 are able to be received by one another (via the mating acceptance of the slot 170 and the first slot 184).

As briefly mentioned above, the first and second prongs 176, 178 of the end-plate 162 are laterally spaced from one another by a distance greater than the thickness T2 of the central-plate 164, and the first and second prongs 194, 196 of the central-plate 164 are likewise laterally spaced from one another by a distance greater than the thickness T2 of the end-plate 162. Accordingly, the end-plate 162 and the central-plate 164 continue to translate (i.e., along the longitudinal axis X) until the bridge region 192 of the central-plate 164 is received by the first region 172 of the end-plate 162 (via the slot 170), and the second region 174 of the end-plate 162 is received by the first region 186 of the central-plate 164 (via the first slot 184). As such, in the completely assembled position, as shown in FIG. 9B, the first and second prongs 176, 178 of the end-plate 162 are disposed adjacent respective, opposing faces of the bridge region 192 of the central-plate 164. Likewise, the first and second prongs 194, 196 of the central-plate 164 (FIG. 9B only showing the second prong 196) are disposed adjacent respective, opposing faces of the second region 174 of the end-plate 162. As further shown in FIG. 9B, the first end 180 of the central-plate 164 extends to second end 168 of the end-plate 162 such that the first end 180 of the central-plate 164 sits flush with the second end 168 of the end-plate 162. This is a result of the second region 174 of the end-plate 162 having the same length (along the longitudinal axis X) as the first region 186 of the central-plate 164. In other words, the second region 174 of the end-plate 162 has the same length as the first slot 184 formed in the central-plate 164. However, it is contemplated that the first slot 184 can have a length different from that of the second region 174 of the end-plate 162. Accordingly, in such a configuration, the second end 168 of the end-plate 162 would not sit flush with the first end 180 of the central-plate 164. In other words, the second end 168 of the end-plate 162 can be offset relative to the first end 180 of the central-plate 164.

Briefly moving back to FIG. 3, the plurality of plates that collectively form the neutron absorber member 132 are all assembled together in the same manner as described above. For example, the second region 190 of the central-plate 164 depicted in FIG. 8 can receive a bridge region 192 of another central-plate (as shown in FIG. 3). Accordingly, with respect to the shown example, two of the central-plates 164 will be assembled to a respective one of the two end-plates 162, and one of the central-plates 164 will be disposed between and assembled to the aforementioned two central-plates 164. Consequently, the plurality of plates (i.e., the end-plates 162 and the central-plates 164) collectively form a neutron absorber member 132 having a cruciform-shaped cross-section (as shown in FIG. 10, discussed below).

After assembly, the neutron absorber member 132 is inserted into the body 126 such that the circumferential wall 137 thereof peripherally surrounds the neutron absorber member 132. Specifically, as shown in FIG. 10, the assembled configuration of the end-plates 162 and the central-plates 164 (which collectively form the neutron absorber member 132) yields a cross-sectional shape of a cruciform (i.e., cross). As shown, the end-plate 162 is perpendicular to the central-plate 164, thereby forming the cruciform-shaped cross-section, wherein both the end-plate 162 and the central-plate 164 are peripherally surrounded by the circumferential wall 137 of the body 126. Moreover, it is to be understood that the neutron absorber member 132 has a cruciform-shaped cross-section at any point along its entire longitudinal length.

Of note, the example shown in FIG. 10 depicts the end-plate 162 being at a 90° angle to the central-plate 164 in order to form the cruciform shaped cross-section. It is contemplated that the angle formed between the end-plate 162 and the central-plate 164 can be different than 90°. For example, the angle therebetween could be acute (but greater than 0°) or obtuse (but less than 180°). In either scenario, the end-plate 162 intersects with (i.e., crosses over) the central-plate 164, thus defining the cruciform shaped cross-section. Accordingly, it is to be understood that the term "cruciform shape" does not limit the orientation of the end-plate 162 and the central-plate 164 to have an angle therebetween that is exactly 90°. The aforementioned obtuse or acute angle formed between the end-plate 162 and the central-plate 164 may be obtained by making the slot 170 and/or the first slot 184 angled relative to the surface of the end-plate 162 and/or the central-plate 164, respectively, or by making the widths of the slot 170 and the first slot 184 sufficiently wide such that the end-plate 162 or the central-plate 164 may be tilted relative to the other of the end-plate 162 or the central-plate 164.

The neutron absorber member 132 having a cruciform shaped cross-section ultimately increases the water volume surrounding the neutron absorber member 132. In turn, this increase in water volume increases the reduction in neutron energy before the neutrons are absorbed by the neutron absorber member 132. In other words, the neutron absorber member 132 being formed of flat plates (having relatively small thicknesses) that are assembled into a cruciform shape provides the technical advantage of greater water volume surrounding the neutron absorber member 132, and thus an overall increase in the reduction of neutron energy.

Briefly moving back to FIG. 3, after the neutron absorber member 132 has been inserted into the body 126, the cap 128 and tip 130 can be assembled to the first and second ends 134, 136, respectively, of the body 126. Specifically, the insertion tube 148 (shown in FIG. 5) of the cap 128 is inserted into the first end 134 of the body 126, until the distal edge 140 (shown in FIG. 4) is seated within the annular groove 152 formed in the head 150 of the cap 128 (shown in FIG. 5). Thereafter, the tabs 147 defined by each cut-out 138 of the first end 134 of the body 126 are mechanically crimped such that those tabs 147 are disposed within and received by the receiving groove 149 (shown in FIG. 5) formed in the insertion tube 148 of the cap 128. In this manner, the cap 128 is secured in place with respect to the body 126. Regarding the tip 130, the insertion member 156 thereof is inserted into the second end 136 of the body 126, until a distal edge of the second end 136 is seated within the annular groove 160 formed in the tip member 158. Thereafter, the tabs 147 defined by each cut-out 138 of the second end 136 of the body 126 are likewise mechanically crimped such that those tabs 147 are disposed within and received by the reception groove 157 (shown in FIG. 6) formed in the insertion member 156 of the tip 130. In this manner, the tip 130 is secured in place with respect to the body 126. After the neutron absorber assembly 124 has been completely assembled, the neutron absorber assembly 124 can then be inserted into a control rod guide tube 112 (as shown in FIG. 2), detailed further below.

Figure 11:
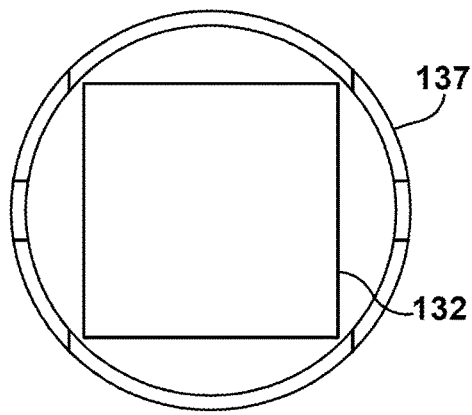
FIG. 11 is a cross-sectional view of the neutron absorber assembly shown in FIG. 3 with an alternative neutron absorber member disposed within the body.
Figure 12:
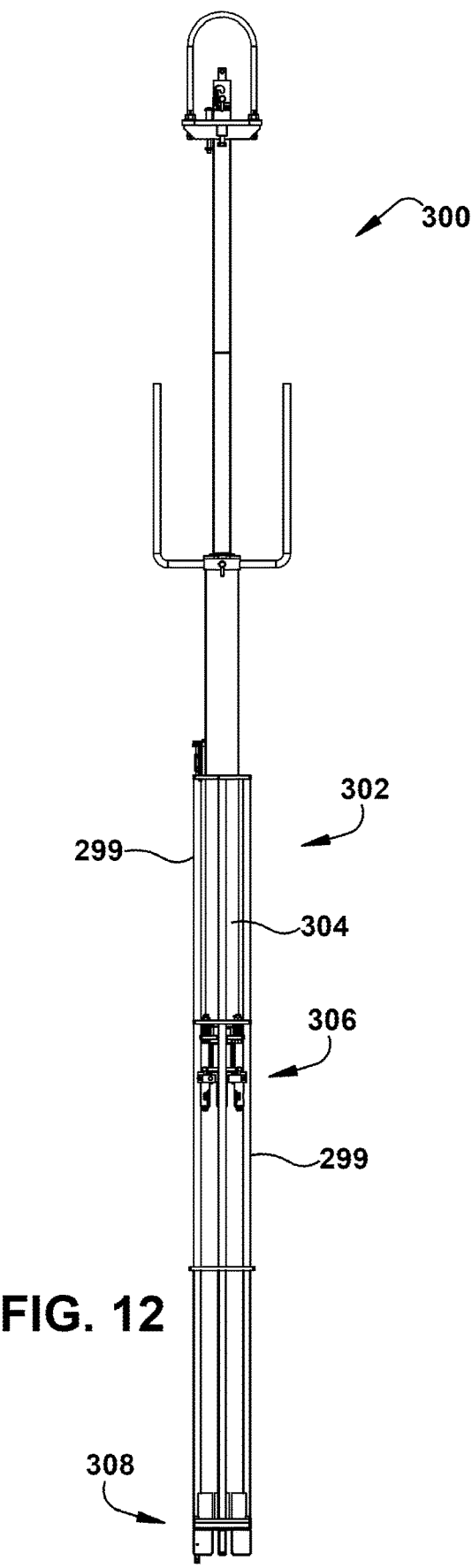
FIG. 12 is a front view of a neutron absorber insertion apparatus for installing and removing neutron absorber assemblies from a fuel assembly.

Moreover, while the aforementioned disclosure relates to a neutron absorber member 132 having a cruciform cross-sectional shape, other neutron absorber members 132 having different cross-sectional shapes are contemplated. For example, as shown in FIG. 11, the neutron absorber member 132 can have a generally square cross-sectional shape. Such a neutron absorber member 132 (as shown in FIG. 11) may be water-jet cut from a flat sheet of rolled neutron absorber material or diamond wheel cut from a flat sheet of isostatically pressed boron carbide. Further still, the neutron absorber member 132 shown in FIG. 11, and the other contemplated neutron absorber members 132 (i.e., having different cross-sectional shapes) can have different dimensions than that of the neutron absorber member 132 having the cruciform cross-sectional shape, shown in FIG. 10. For example, the circumferential wall 137 shown in FIG. 11 may have a diameter that is half of the diameter of the circumferential wall 137 shown in FIG. 10. Thus, the neutron absorber member 132 shown in FIG. 11 would have complimentary dimensions with respect to the circumferential wall 137 (in FIG. 11) in order to permit the neutron absorber member 132 to be received within the circumferential wall 137.

Referring now to FIGS. 12-15, a neutron absorber insertion apparatus 300 is shown as including a frame 302, a casing 304, a grappling assembly 306, and an alignment base 308. The frame 302 includes a plurality of guide rods 299 oriented parallel with respect to one another in order to form a protective cage about the grappling assembly 306. The casing 304 extends within the frame 302 and includes transportation means (e.g., a hydraulic system, a pneumatic system, etc.) configured to translate the grappling assembly 306 within the frame 302, as will be detailed further below.

Figure 13:
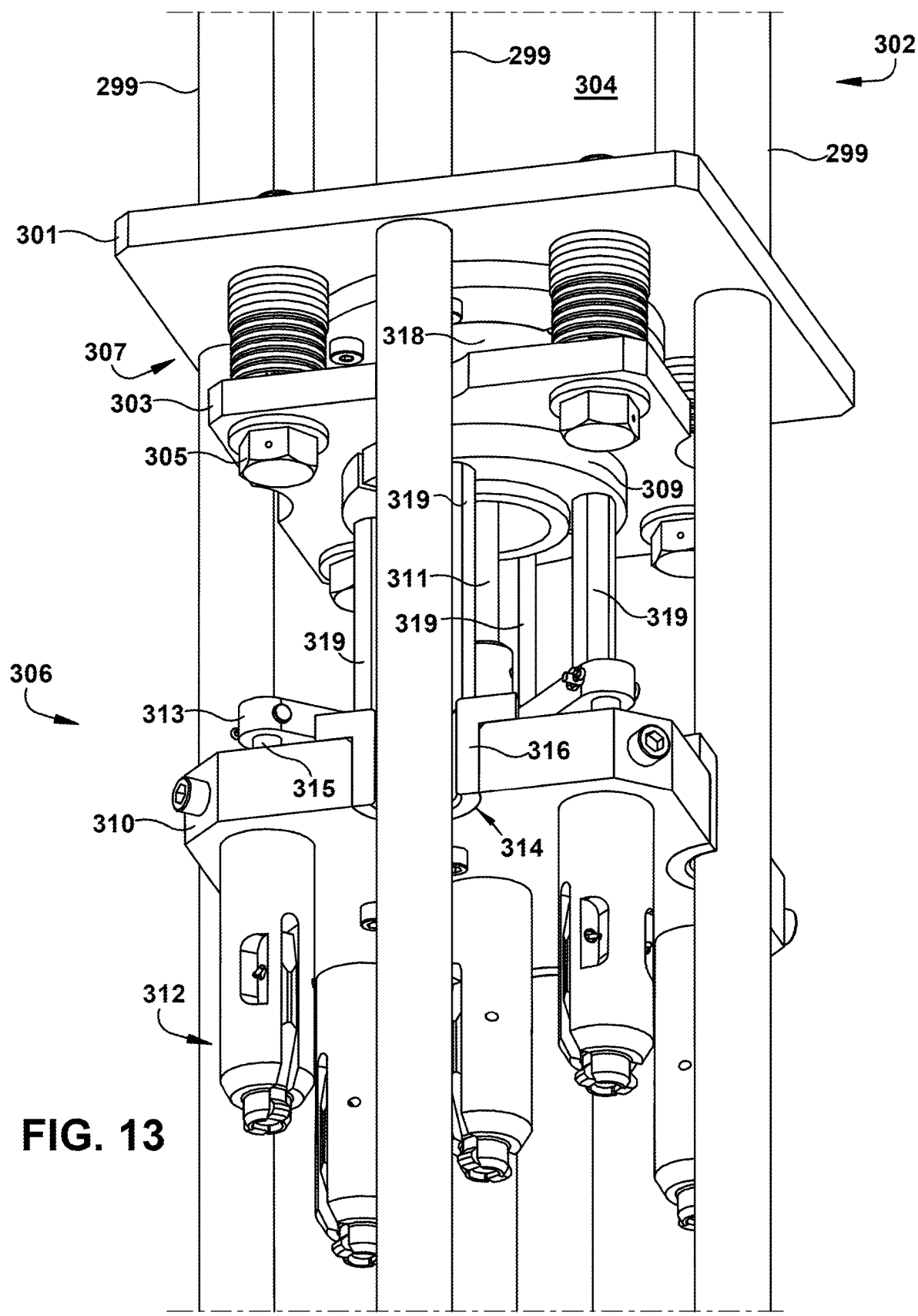
FIG. 13 is a detailed, perspective view of a grappling assembly of the neutron absorber insertion apparatus shown in FIG. 12.

Moving on to FIG. 13, a detailed view of the grappling assembly 306 is shown. Specifically, the grappling assembly 306 includes a support member 310 disposed within the frame 302 and supporting a plurality of grappling tubes 312 disposed thereon. As shown, the support member 310 has a generally square configuration with guide slots 314 formed in its outer periphery. The guide slots 314 are configured to permit the support member 310 to slide (i.e., translate) within the frame 302. As shown, the guide slots 314 partially receive a respective one of the guide rods 299. In this manner, the support member 310 is peripherally bounded by the frame 302 and thus laterally supported thereby during operational movement. Alternatively, the guide slots 314 can be formed as circular apertures that completely surround a respective one of the guide rods 299. Further still, the support member 310 may be dimensioned such that its outer periphery is disposed at a spaced distance from the frame 302 (i.e., the guide rods 299). In such a configuration, the support member 310 need not include the aforementioned guide slots 314. Moreover, as further shown, a bearing 316 may be disposed in each guide slot 314 in order to enhance the mobility of the grappling assembly 306.

The grappling assembly 306 is connected to the transportation means via a central arm 318. That is, the central arm 318 is translatable (via the transportation means) in order to translate the grappling assembly 306 within the frame 302. As further shown, the grappling assembly 306 is disposed beneath a frame support plate 301 and an arm alignment plate 303. The frame support plate 301 includes apertures (not shown) that receive a respective one of the guide rods 299 such that the guide rods 299 pass through the frame support plate 301. In this manner, the frame support plate 301 structurally fortifies the frame 302. The arm alignment plate 303 is secured to the frame support plate 301 via bolts 305, each surrounded via a spring assembly 307. In particular, the spring assemblies 307 collectively serve as a shock-absorber, as will be further detailed below. In the example shown, the spring assemblies 307 are depicted as disc springs (and washers), however other known types of springs are contemplated.

The arm alignment plate 303 includes a central through-hole (not shown) formed therein that receives the central arm 318 in a manner such that the central arm 318 is movable (i.e., translatable) through the arm alignment plate 303 (via the central through-hole). A collar 309 is disposed near a distal end of the central arm 318, and is positioned beneath the arm alignment plate 303. The collar 309 extends radially outwards from the central arm 318 and can be formed integral therewith (i.e., during a simultaneous manufacturing process) or separate and distinct therefrom and subsequently secured thereto. Of note, the collar 309 provides a mounting face for pillars 319 that connect the support member 310 to the central arm 318.

As further shown, an activation arm 311 extends at least partially through the central arm 318 and is coaxial therewith. A distal end of the activation arm 311 operatively connects to an activation plate 313 having activation pins 315 extending outwards therefrom. As will be explained further below, each of the activation pins 315 extends into a respective one of the grappling tubes 312 and is configured to translate therein. Moreover, it is to be understood that the frame support plate 301 and the arm alignment plate 303 are both stationary elements of the neutron absorber insertion apparatus 300. That is, neither the frame support plate 301 nor the arm alignment plate 303 moves with respect to the central arm 318 and/or the support member 310.

As further shown, the plurality of grappling tubes 312 extend outwards from a face of the support member 310, opposite from the central arm 318. In the illustrated example, a total of five grappling tubes 312 are shown, each configured to align with and connect to a designated one of a neutron absorber assembly 124. It is to be understood that the grappling assembly 306 is not limited to five grappling tubes 312, and that any number of grappling tubes 312 may extend from the support member 310. Further, it is to be understood that the arrangement of the grappling tubes 312 is to coincide with the arrangement of control rod guide tubes 112 (e.g., as shown in FIG. 2), which are accessible through the top surface 116 of the top nozzle 102 of the spent fuel assembly 100.

Figure 14:
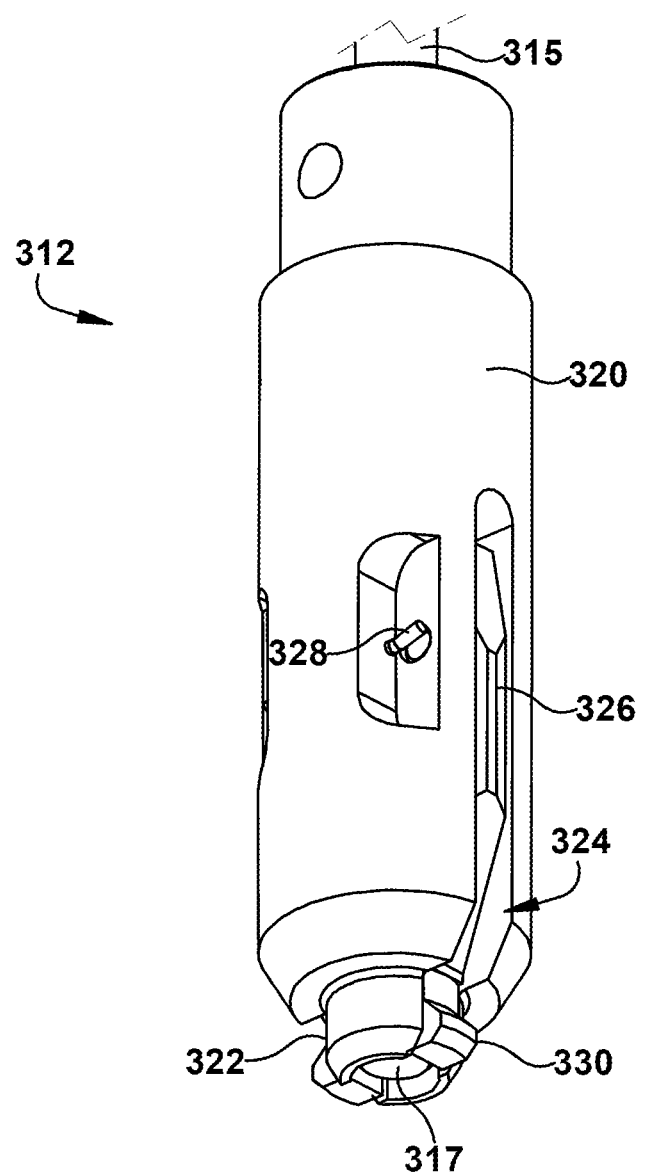
FIG. 14 is an isolated view of a single grappling tube of the grappling assembly shown in FIG. 13.

Moving now to FIG. 14, a single grappling tube 312 is shown. It is to be understood that the below-disclosures relating to the single grappling tube 312 likewise apply to the other grappling tubes 312 depicted in FIG. 13. The grappling tube 312 includes a cylindrical body 320 and a nose 322 at a distal end thereof. The cylindrical body 320 and the nose 322 may be formed integrally (i.e. simultaneously during a single manufacturing process) or separate and distinct from one another and subsequently secured together. As further show, the nose 322 has a diameter smaller than that of the cylindrical body 320. Moreover, a diametrical slot 324 is formed completely through the cylindrical body 320 and the nose 322.

As further shown, anchors 326 are disposed substantially within the diametrical slot 324. The anchors 326 are pivotally connected to the cylindrical body 320 (via hinge pins 328) at a first end thereof. A flanged tip 330 is provided at a second end of each anchor 326. Specifically, the flanged tip 330 is configured to have complimentary geometry with respect to that of the inner sidewall 155 of the cavity 154 formed in the cap 128 (shown in FIG. 5). As will be further detailed below, the anchors 326 are configured to pivot radially inwards and outwards from the diametrical slot 324. In particular, the illustrated example depicts the anchors 326 in an engagement position (i.e., the anchors 326 are pivoted radially outwards from the diametrical slot 324). The anchors 326 are freely-floating in a stowed positioned (i.e., disposed entirely within the diametrical slot 324) and pivot radially outwards to the engagement position, as will now be explained. In order to pivot the anchors 326 from the stowed position towards the engagement position, a head 317 of the activation pin 315 translates within the cylindrical body 320 in order to physically interface with the anchors 326 and pivot them radially outwards.

Figure 15:
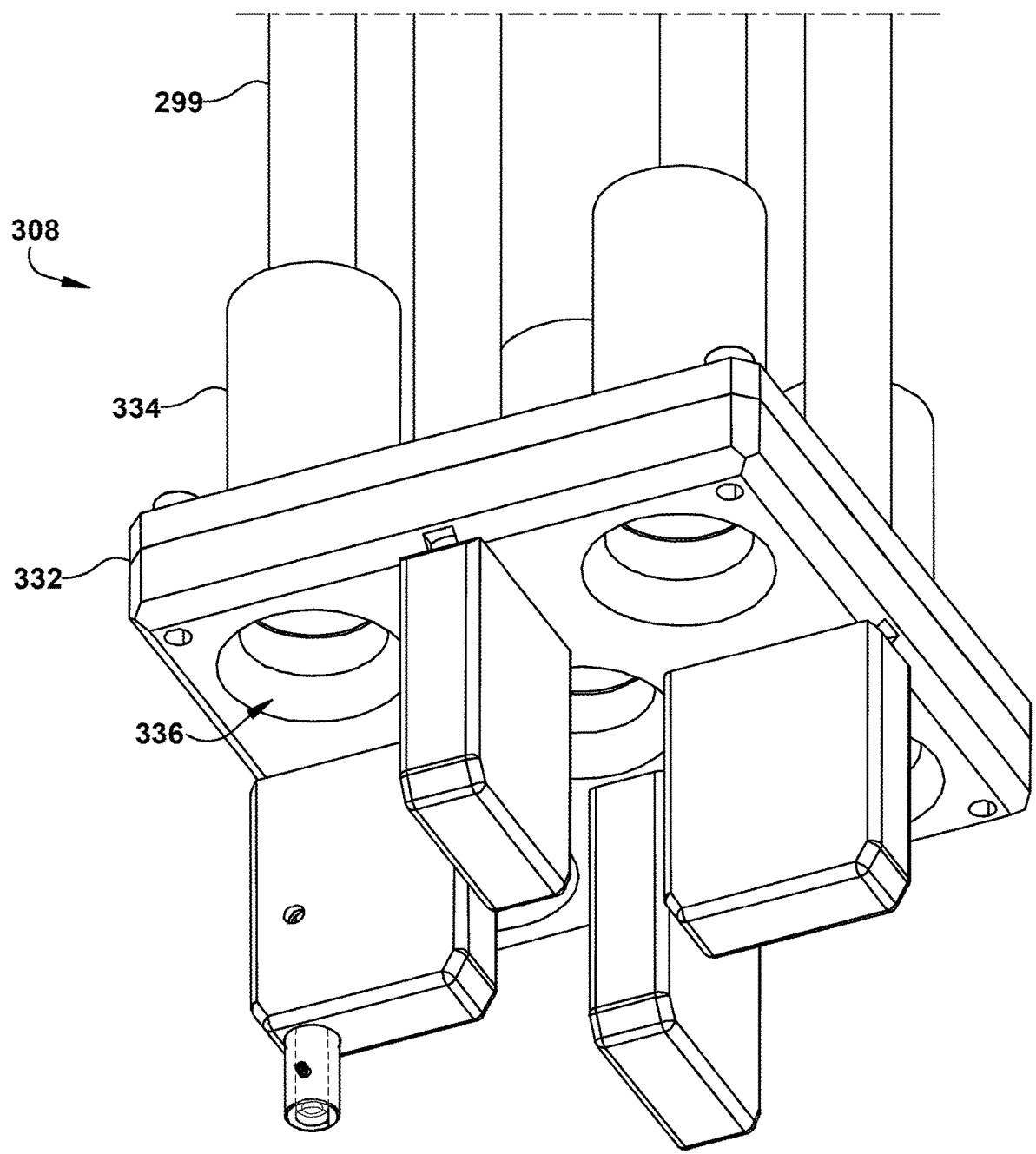
FIG. 15 is a detailed, perspective view of an alignment base of the neutron absorber insertion apparatus shown in FIG. 12.

With respect to FIG. 15, the alignment base 308 includes a support base 332 having a generally square shape. A distal end of the frame 302 (i.e., the rods) is secured to the support base 332. Moreover, the support base 332 includes hollow, cylindrical housings 334 that are coaxial with respective apertures 336 formed completely through the support base 332. Both the housings 334 and the apertures 336 are configured and dimensioned to receive a respective one of the grappling tubes 312.

Reference will now be made to operation of the neutron absorber insertion apparatus 300 with respect to the above-disclosed neutron absorber assemblies 124. Initially, the neutron absorber insertion apparatus 300 is vertically suspended by an overhead hoist (not shown) over a magazine containing a plurality of neutron absorber assemblies 124 in a spent fuel pool. The neutron absorber insertion apparatus 300 is lowered (i.e., via the hoist) onto the top of the magazine such that the support base 332 is disposed directly thereabove. A mechanical flag may be provided to indicate proper alignment between the magazine and the neutron absorber assemblies 124. After confirmation of correct alignment, the grappling assembly 306 is lowered within the frame 302 (via the transportation means) such that each of the grappling tubes 312 is received within a respective one of the cylindrical housings 334 of the support base 332. Specifically, the central arm 318 translates (vertically downwards) within the casing 304 which, in turn, translates the support member 310 downwards towards the support base 332. Of note, while the support member 310 is being translated downwards, the anchors 326 of each grappling tube 312 are in the stowed position, as detailed above.

After the grappling assembly 306 has been completely lowered, the nose 322 of each grappling tube 312 will be disposed within and received by a respective cavity 154 formed in the caps 128. Thereafter, an operator manually actuates a lever in order to pivot the anchors 326 of the grappling tubes 312 radially outwards. In particular, when the lever is actuated, the activation arm 311 translates downward which, in turn translates the activation plate 313 downwards. Further, because each of the activation pins 315 is connected to the activation plate 313, each activation pin 315 will likewise translate downwards (within their respective grappling tubes 312) in order to pivot the anchors 326 radially outwards to their engagement position (as shown in FIG. 14). In this manner, the flanged tips 330 of the anchors 326 will engage against the inner sidewalls 155 of each cavity 154, thus permitting the grappling tubes 312 to securely grip the caps 128 of respective neutron absorber assemblies 124. Of note, the lever can be mechanically locked in place to prevent inadvertent disconnection between the grappling tubes 312 and the neutron absorber assemblies 124.

Thereafter, the neutron absorber insertion apparatus 300 is raised from the magazine (via the hoist) and transported to a fuel assembly (e.g., the fuel assembly, shown in FIG. 1) awaiting neutron absorber assemblies 124. Specifically, the neutron absorber insertion apparatus 300 is disposed vertically above the top nozzle 102 of the fuel assembly 100 such that each neutron absorber assembly 124 coaxially aligns with a respective one of the control rod guide tubes 112. Proper alignment may be indicated via a mechanical flag. Thereafter, the grappling assembly 306 is lowered until each neutron absorber assembly 124 is fully inserted into a respective one of the control rod guide tubes 112. Complete insertion of the neutron absorber assemblies 124 can be verified by mechanical indicators visible by the operator.

After verifying this, the grappling tubes 312 can be disengaged (i.e., disconnected) from their respective neutron absorber assemblies 124. For example, the lever can be actuated once again so as to translate the activation plate 313, and thus the activation pins 315, upwards in order for the heads 317 of each activation pin 315 to disengage from respective anchors 326, which will thus pivot (radially inwards into their stowed position) such that the flanged tips 330 no longer contact and/or engage the inner sidewalls 155 of the cavity 154 of respective caps 128. Subsequently, the neutron absorber insertion apparatus 300 can be removed from the spent fuel assembly 100. Of note, as the activation plate 313 is translated to its upward-most position, the spring assemblies 307 will collectively act as a shock-absorber such that excess force is not imparted onto the frame support plate 301.

The invention has been described with reference to the example embodiments described above. Modifications and alterations will occur to others upon a reading and understanding of this specification. Examples embodiments incorporating one or more aspects of the invention are intended to include all such modifications and alterations insofar as they come within the scope of the appended claims.

What is claimed is:

1. A neutron absorber assembly that is configured to be inserted into a control rod guide tube of a spent fuel assembly, the neutron absorber assembly comprising:
 a hollow, elongated body extending along a longitudinal axis between a first end and a second end;
 a cap disposed at the first end of the hollow body;

a tip disposed at the second end of the hollow body; and a neutron absorber member received within the hollow body and extending along the longitudinal axis, the neutron absorber member having a first plate and a second plate that are separate from one another and that are arranged with respect to one another to have a cross-sectional shape of a cruciform.

2. The neutron absorber assembly of claim 1, the cap including an insertion tube and a head, the insertion tube configured to be received within the hollow body and the head configured to close the first end of the hollow body.

3. The neutron absorber assembly of claim 2, wherein an annular groove is formed in the head and circumscribes the insertion tube, the annular groove being configured to receive a distal edge of the first end of the hollow body.

4. The neutron absorber assembly of claim 2, wherein a cut-out is formed in the hollow body at the first end thereof to define at least one tab, and a receiving groove is formed in the insertion tube and is configured to receive the tab therein.

5. The neutron absorber assembly of claim 2, wherein the cap includes a cavity formed in the head that communicates with a passageway formed in the insertion tube.

6. The neutron absorber assembly of claim 1, the tip including an insertion member configured to be received within the hollow body, and a tip member having a distal end that is conically shaped.

7. The neutron absorber assembly of claim 1, wherein the cross-sectional shape of the neutron absorber member remains constant along the longitudinal axis.

8. The neutron absorber assembly of claim 1, wherein each of the first plate and the second plate has a pair of prongs provided at respective ends thereof, said pair of prongs being spaced from one another in a direction perpendicular to the longitudinal axis, wherein the first plate and the second plate engage each other such that the pair of prongs of the first plate are disposed adjacent respective, opposite faces of the second plate, and wherein the pair of prongs of the second plate are disposed adjacent respective, opposite faces of the first plate.

9. The neutron absorber assembly of claim 1, the neutron absorber member further comprising a third plate that is separate from the first plate and the second plate, wherein the third plate engages the second plate, and the first plate and the third plate are coplanar.

10. The neutron absorber assembly of claim 1,
said first plate having an elongated body extending along the longitudinal axis between a first end and a second end, the first plate having a slot formed therethrough at the first end, the slot extending from the first end towards the second end and defining first and second prongs such that the first prong is laterally spaced from the second prong by the slot,
said second plate being disposed within the slot of the first plate, the second plate having an elongated body extending along the longitudinal axis between a first end and a second end, the second plate having a first slot formed therethrough at the first end, the first slot extending from the first end of the second plate towards the second end of the second plate and defining first and second prongs of the second plate such that the first prong of the second plate is laterally spaced from the second prong of the second plate by the first slot,
wherein the first plate is disposed within the first slot of the second plate such that the first prong and the second prong of the first plate are disposed adjacent respective, opposite faces of the second plate and the first prong and the second prong of the second plate are disposed adjacent respective, opposite faces of the first plate.

11. The neutron absorber assembly of claim 1,
said first plate having an elongated body extending along the longitudinal axis between a first end and a second end, the first plate having a slot formed therethrough at the first end, the slot extending from the first end towards the second end, and
said second plate being disposed within the slot of the first plate.

12. The neutron absorber assembly of claim 11, the first plate having first and second regions, wherein the first region extends from the first end to the second region along the longitudinal axis, wherein the second region extends from the first region to the second end along the longitudinal axis, wherein the slot is formed through the first plate at the first region, and wherein the slot is not formed through the first plate at the second region.

13. The neutron absorber assembly of claim 11, wherein the slot defines a first prong and a second prong of the first plate such that the first prong is laterally spaced from the second prong by the slot, and wherein the first prong is disposed adjacent a face of the second plate and the second prong is disposed adjacent an opposite face of the second plate.

14. The neutron absorber assembly of claim 11, the second plate having an elongated body extending along the longitudinal axis between a first end and a second end, the second plate having a first slot formed therethrough at the first end, the first slot extending from the first end of the second plate towards the second end of the second plate, wherein the first plate is disposed within the first slot of the second plate.

15. The neutron absorber assembly of claim 14, the second plate having a second slot formed therethrough at the second end, the second slot extending from the second end of the second plate towards the first end of the second plate.

16. The neutron absorber assembly of claim 15, the second plate having a first region, a second region, and a bridge region disposed between the first region and the second region along the longitudinal axis, wherein the first slot is formed in the first region, wherein the second slot is formed in the second region, and wherein neither the first slot nor the second slot is formed in the bridge region.

17. The neutron absorber assembly of claim 15, further comprising a third plate disposed within the second slot of the second plate.

18. The neutron absorber assembly of claim 17, wherein the first plate and the third plate are coplanar.

19. The neutron absorber assembly of claim 11, wherein the cross-sectional shape of the neutron absorber member remains constant along the longitudinal axis.

20. The neutron absorber assembly of claim 11, wherein an end of the second plate is flush with the second end of the first plate.

* * * * *